United States Patent [19]
Stobart

[11] Patent Number: 6,138,741
[45] Date of Patent: Oct. 31, 2000

[54] STABILITY STRETCHER FRAME

[76] Inventor: John Stobart, 1240 Drift Rd., Westport, Mass. 02790

[21] Appl. No.: 09/138,968

[22] Filed: Aug. 24, 1998

[51] Int. Cl.[7] ...................................................... A47G 5/00
[52] U.S. Cl. ........................ 160/374.1; 160/381; 403/176; 403/402; 38/102.5
[58] Field of Search ................................ 160/374.1, 381, 160/374, 373, 372, 376, 378, 405; 38/102.5, 102.4, 102.6, 102.9, 102.91; 403/401, 402, 295, 297

[56] References Cited

U.S. PATENT DOCUMENTS

| | | | |
|---|---|---|---|
| 373,156 | 11/1887 | Smyth | 160/374.1 |
| 659,994 | 10/1900 | Tait | 160/374.1 |
| 1,128,362 | 2/1915 | Rawbon | 160/374.1 X |
| 2,149,985 | 3/1939 | Tepper | 160/374.1 X |
| 3,238,996 | 3/1966 | Munn | 160/374.1 |
| 4,236,847 | 12/1980 | Yasuda | 403/402 |
| 4,509,882 | 4/1985 | Lautenschlager | 403/402 |
| 4,516,341 | 5/1985 | Jenkins | 403/402 X |
| 4,718,184 | 1/1988 | Sherman | 403/402 X |
| 4,829,685 | 5/1989 | Persson et al. | 38/102.5 |
| 4,947,922 | 8/1990 | Stobart | 160/374.1 |
| 5,052,462 | 10/1991 | Stobart | 160/374.1 |
| 5,148,648 | 9/1992 | Sorenson et al. | 403/176 X |
| 5,149,236 | 9/1992 | Rapayelian | 403/401 X |
| 5,531,613 | 7/1996 | Takano et al. | 439/544 |
| 5,857,558 | 1/1999 | Irvine | 198/803.2 |

*Primary Examiner*—Daniel P. Stodola
*Assistant Examiner*—Bruce A. Lev
*Attorney, Agent, or Firm*—Robert K Tendler

[57] ABSTRACT

An improved stability canvas tensioning picture frame which is formed by a plurality of abutting frame members is provided with a tapered screw and facing tapered channels in the abutting frame members, with each of the abutting frame members having a semi-circular slot adapted to receive an apertured disk in a mild interference fit, with the single apertured disk providing longitudinal and lateral stability between the abutting frame members when the screw is screwed down into the tapered channel to move the abutting members away from each other.

10 Claims, 3 Drawing Sheets

STABILITY STRETCHER FRAME

FIELD OF INVENTION

This invention relates to frames which mount an artist's canvas, and more particularly to frames which tension such canvas to eliminate any distortion or wrinkle lines developing on the surfaces of the canvas.

BACKGROUND OF THE INVENTION

As illustrated in U.S. Pat. No. 5,052,462, a canvas tensioning picture frame is illustrated in which a frusto-conical screw is passed through two disks, with the screw being rotated to force the abutting frame members apart, thereby to provide tensioning. While this two disk structure works relatively well to provide a stable structure for the use of canvas tensioning, it nonetheless requires two disks carried in respective slots in the abutting frame members to provide for the relative stability of the frame.

It was thought that the two disks were necessary to provide lateral and longitudinal stability when the abutting frame members were moved apart to tension the canvas. The lateral and longitudinal stability is necessary to prevent wrinkling of the canvas or warping of the frame members with respect to each other. Moreover, as described in this patent, the first of the disks through which the screw passes has raised ribs and a square aperture, such that the screw is captured in the disk and is rotated by virtue of rotating the disk. In this design, there is a trade off between the tightness with which the first disk is carried by the abutting frame members and the ability to rotate the screw. The result is that the first disk is made tight within its slot to preserve the dimensional stability of the framing system, which tightness precludes easy turning of the tapered screw.

Thus, for structural stability the first disk must be quite tight within its slot. However, its rotation is difficult and also disturbs the alignment of the abutting frame members. While this canvas stretcher has worked quite satisfactorily in the past, there is an opportunity for significant structural and cost improvements.

By way of general background, it will be appreciated that an artist's canvas is, in general, held stretched tight upon a stretcher bar frame. The requirements of such a frame are that it should be optimally rigid against torsion and twisting, dimensionally stable during temperature or humidity changes, light weight and inexpensively constructed of readily available materials. Typically, and as described in the aforementioned patent, the frame is made of wood with mitered corners which may exhibit duck-tail or other types of interlocking corner joints. Over prolonged time periods deformation of the hand stretched canvas frame is induced by longitudinal and lateral stresses arising from the canvas or from the environment. These stresses can cause deviations from the desired angle between the frame members, normally a right angle and/or a twisting or warping of the frame in its established plane. Such warpage or twisting of the frame typically causes stress to be developed in the canvas, which after prolonged duration, results in wrinkles be generated in the canvas. In an attempt to remedy such wrinkles, it has long been known to manually drive wooden wedges between adjacent ends of the frame members at the mitered corners of the frame, which cause a selective spreading of the frame members to re-stretch the canvas thereon.

Such wooden wedges, however, typically weaken the corner joint integrity and often result in further frame warpage, thereby perpetuating the problem. In addition, the manual driving of the wedges into the corners of the frame often causes inadvertent cutting or tearing of the canvas due to abrasion of the wedge upon rear surface of the canvas. Such inadvertent weakening, of course, results in permanent, non-recoverable damage to the artist's rendition on the canvas. In view of the recognition of this problem, certain framing solutions involving a long term tensioning a canvas stretched upon a frame has been sought. Particularly, certain frames which constantly tension the canvas stretched upon such frames have been developed in the prior art. One such wedge type solution is shown in U.S. Pat. No. 1,128,362; whereas a screw actuated tensioning device is shown in U.S. Pat. No. 2,149,985.

In the past, camming devices have been utilized in between adjacent and abutting frame members such as illustrated in U.S. Pat. No. 3,238,996, 371,933 and 371,934. Of particular interest is U.S. Pat. No. 4,829,685 in which a camming member, when rotated, bears upon an arcuate hollow portion of an adjacent frame member, with the screw bearing upon an opposite semi-circular cut in the abutting frame member.

It will be appreciated that in all of the above noted background patents, the structural stability of the frame doing tensioning or otherwise is in question. In general, it has been found by the prior art that the structural stability needs to be increased such as through the utilization of pegs, elbows, screws, or complicated mechanical stability producing devices. Thus, for instance, in the aforementioned Pat. No. 5,052,462, a double disk structural rigidity reinforcing structure was deemed necessary.

By way of further background, one prior art frame of this type is the "GOLDLINE" constant tension, stretched-canvas frame available from H. W. Peel & Co., Ltd., Norwester House, Fairway Estate, Fairway Drive, Greenford, Middlesex, UB6 8PW, United Kingdom. This frame uses wood peripheral frame members which are mitered to approximately 45 degrees at their corners. An elongate metal spring clip is positioned between adjacent frame members at the junction of their mitered corners. This spring clip tends to force the adjacent frame members apart from each other. The frame members are not directly or rigidly affixed to each other. Rather, in order to hold each pair of adjacent frame members together in their desired spatial relationship defining a frame, a plastic corner piece is used at each corner joint. The plastic corner piece slidably engage adjacent wooden frame members and lie over the top of the centrally positioned spring clip. The plastic corner pieces attempt to hold the wooden frame members, which are being forcibly spread apart by the spring force generated in the intervening spring clip, in positional alignment even though the frame members are not in direct contact with one another. In maintaining this positional alignment, the plastic corner pieces attempt to suppress the torsional, longitudinal and vertical movements which might otherwise result in a distortion of the frame. The plastic corner pieces further attempt to prevent twisting of adjacent frame members relative to one another, and to thereby prevent any resultant distortion of the plane of the canvas established by such frame. As will be discussed after further consideration of the construction of this prior art constantly tensioning, stretched-canvas frame, these attempts are not completely successful.

In order to assemble the "GOLDLINE" constant tension, stretched-canvas frame, the canvas is stretched over, and tacked to, the sides of the peripheral frame members while the frame members are held in alignment by the plastic corner pieces. The metal spring clips are then positioned between the mitered corners of adjacent frame embers, thereby spreading the frame members apart and tensioning the canvas. In order that even further additional tensioning forces may be applied, it is also known in this prior art frame to position a central cross members consisting of two perpendicular arms within the rear interior region of the frame. Each arm of the cross member spans between an opposed pair of frame members.

Each of four ends of the two cross member arms do not directly abut the frame member adjacent its end, but rather contact the frame member through additional intervening spring clips. Since the wooden pieces of the peripheral frame members and of the cross members are not directly connected, plastic guide pieces are used to maintain required alignments. The additional cross member, plastic comer pieces and the plastic guide pieces undesirably add considerable weight and cost to the frame.

This particular "GOLDLINE" prior art stretcher frame is utilized to continuously present tensioning forces to the canvas which is stretched taut upon it. However, in order to obtain this tensioning, and the required "full-floating" relationship between all frame members, this prior art tensioning frame incurs a great penalty in the establishment and maintenance of a precision alignment between and among the frame members. The plastic comer pieces must slidably engage the fame members over a large surface area, on the order of several square inches, in order to obtain an adequate grasp on such frame members for the purpose of establishing and maintain their relative alignment. However, both the frame pieces and the plastic comer pieces are poorly adaptable to precision construction. Furthermore, the dimensions of the wooden frame members vary with temperature, humidity, and age relative to the retaining plastic comer pieces.

These prior art comer plastic pieces, which slidably engage the frame members in order to guide them into alignment, have therefore proven to be generally inadequate for this task. Particularly, the "GOLDLINE" prior art stretcher frame does not exhibit an alignment between frame members which is as equivalently rigid, precise or permanent to the alignment routinely attained by prior art fixed, non-tensioning frames with rigid comer joints.

SUMMARY OF THE INVENTION

In order to alleviate the problems associated with the canvas stretching or tensioning device described in U.S. Pat. No. 5,052,462, with its attendant difficulty in turning the tapered screw while at the same time maintaining sufficient lateral and longitudinal stability, it has been found that a single disk pressed into opposing semi-circular slots in abutting frame members in a mild interference fit provides sufficient lateral and longitudinal stability, while at the same time permitting the tapered screw to be easily rotated in an oversized aperture in the single disk. The term mild interference fit for purposes of this application means that the thickness of the disk equals or is greater than the width of the slot.

It has been found that by making the single disk of a diameter approaching two thirds of the width of an abutting frame member and by providing that the thickness of the disk be no less than one third the thickness of the frame member, sufficient lateral stability can be achieved through the utilization of only one disk.

The disk, in essence, is forced into adjacent semi-circular facing slots of the abutting frame members, with each of the abutting frame members having a tapered half-channel which runs in one embodiment from the top surface of the frame member through the slot for the disk and into, if not out of, the bottom of the frame member. When the abutting members are together, the half channels in the abutting members form the tapered channel into which the screw is rotated. In one embodiment, the disk is made of Delrin or Nylon, with both materials providing disks with self-lubricated surfaces.

In operation, the frame is assembled with abutting frame members having the single disk positioned therebetween in a tight fit. The screw is then inserted down through the tapered channel formed by the abutting members into the oversized aperture in the disk and then down into the remainder of the tapered channel in the abutting frame members. Rotating the screw into the tapered slot causes the abutted frame members to move away, thus providing tensioning.

Due to the oversized disk and the mild interference fit of the disk with respect to the slots into which the disk is inserted, surprising lateral and longitudinal stability is achieved.

In summary, an improved stability canvas tensioning picture frame which is formed by a plurality of abutting frame members is provided with a tapered screw and facing tapered channels in the abutting frame members, with each of the abutting frame members having a slot adapted to receive an apertured flat insert in a mild interference fit, with the single apertured insert providing longitudinal and lateral stability between the abutting frame members when the screw is rotated into the tapered channel to move the abutting members away from each other.

BRIEF DESCRIPTION THE DRAWINGS

These and other features of the subject invention will be better understood from the Detailed Description in conjunction with the Drawings of which:

DETAILED DESCRIPTION

Figure 1:
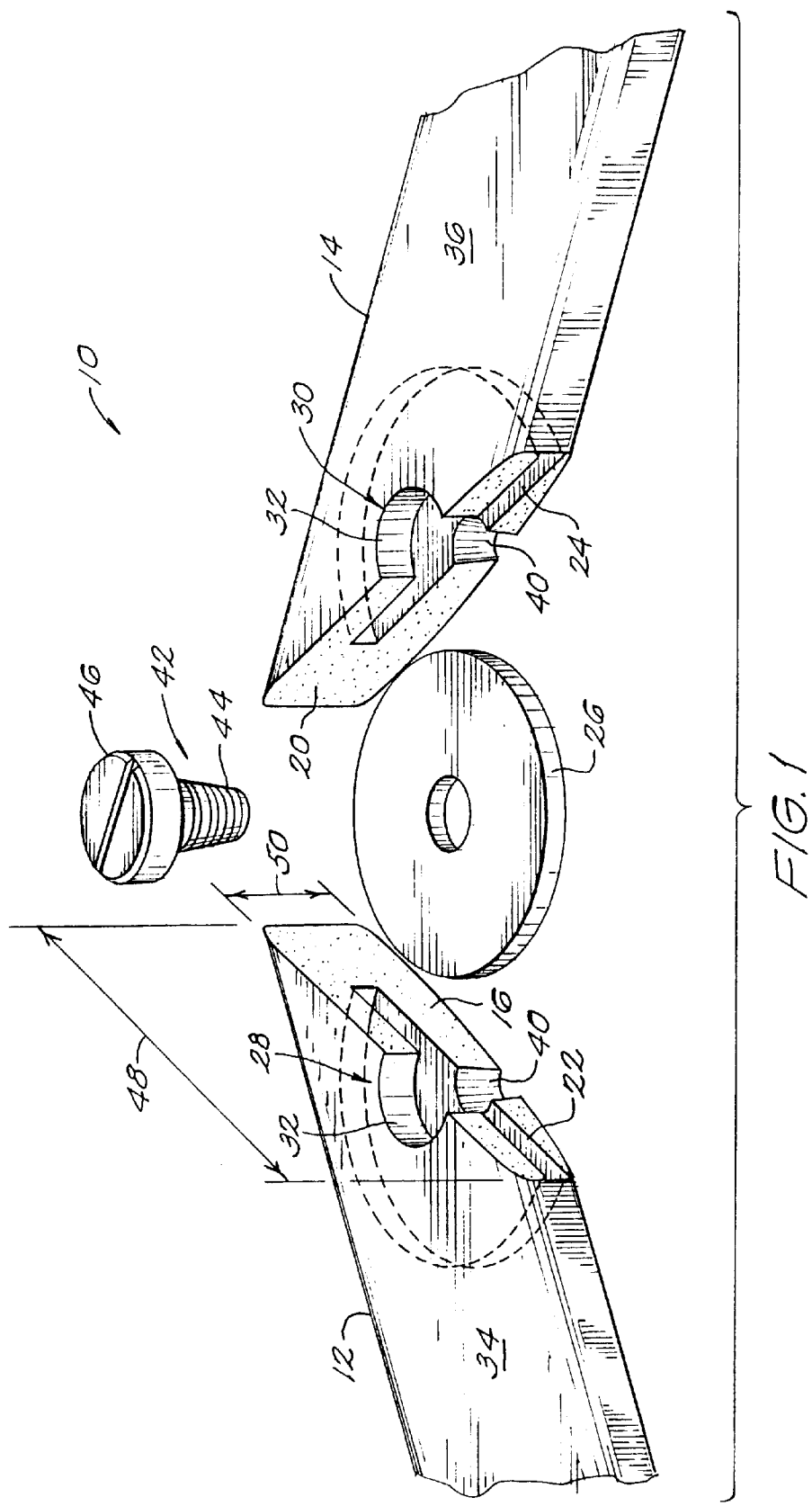
FIG. 1 is an exploded diagram of the tensioning system for abutting frame members showing the single disk, tapered screw and tapered channel structure utilized in the tensioning process.

Referring now to FIG. 1, a stretcher frame 10 includes abutting frame members 12 and 14 which have mitered ends 16 and 20 respectively. Each of the abutting frame members has a semi-circular slot 22 and 24 which is adapted to carry a disk 26 therein in a mild interference fit. Frame members 12 and 14 have facing channel halves 28 and 30 forming the tapered channel 32, with the tapered channel running through slot 22 and 24 such that an enlarged portion of channel 32 exists in the upper surfaces 34 and 36 of respective abutting frame members.

A lower portion 40 of tapered channel 32 is carried beneath slots 22 and 24 and is adapted to coact with tapered screw 42 having a frusto-conical tapered portion 44 beneath a head 46.

In one embodiment, the diameter of disk 26 is at least two thirds that of the width of the abutting frame member, here illustrated by arrow 48, whereas the thickness of the disk 26 is no less than one third the thickness of the adjacent frame member, here illustrated by arrow 50. In this embodiment, the disk has a diameter of 2⅛" and is 3/16" thick, with the disk being made of 6/6 nylon or DELRON. Its mild interference fit insertion into the slots in the abutting frame member allows but limited relative motion of the abutting members. This limited motion permits separation of the abutting members only in response to the high torque applied by screw 42. Thus, for all intents and purposes, the disk is affixed to the abutting frame members.

The use of the oversized disk along with its relative thickness compared to that of the abutting frame members provides exceptional lateral and longitudinal stability for the frame as screw 46 is rotated into the tapered channel formed by channel halves 28 and 30.

Figure 2:
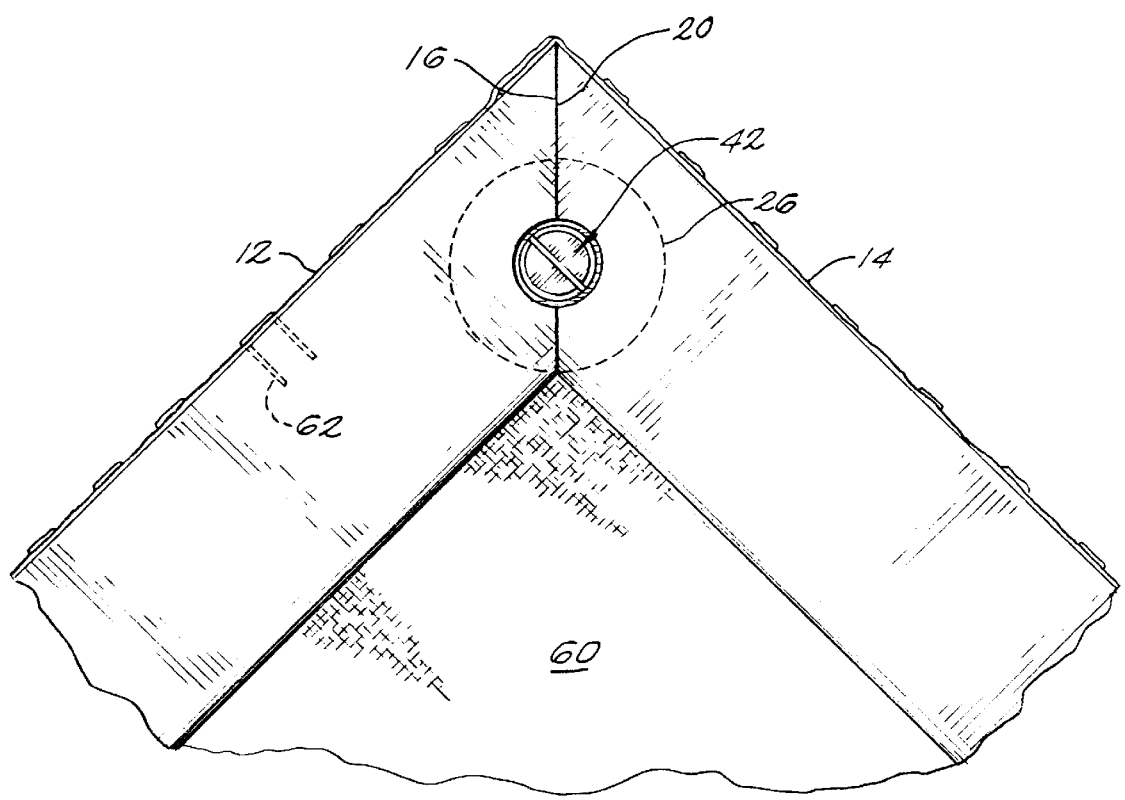
FIG. 2 is a bottom view of a portion of the tensioning apparatus illustrating the canvas stretched about a comer having the abutting frame members prior to the tapered screw being rotated to separate the abutting frame members.

Referring now to FIG. 2 and in operation, canvas 60 is stapled to the outside abutting frame members 12 and 14 as illustrated by staples 62 shown in dotted outline. The abutting edges 16 and 20 of the abutting frame members are initially in contact, as illustrated, in which screw 42 has yet to be rotated into the aforementioned tapered channel.

Figure 3:
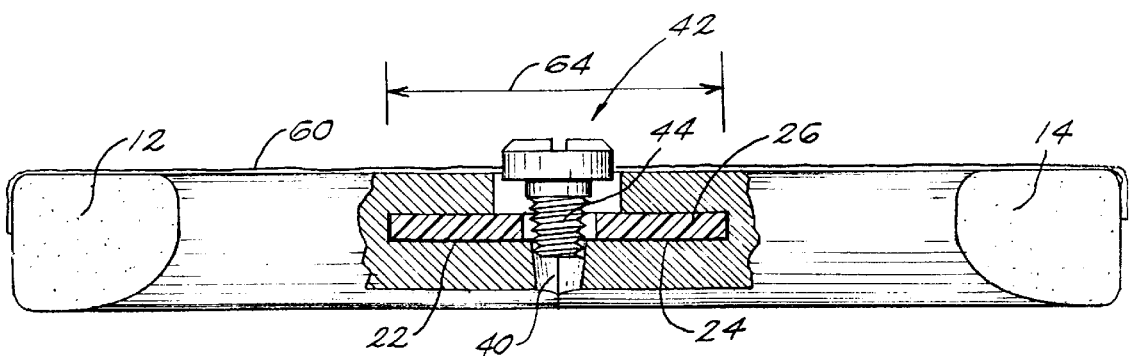
FIG. 3 is a cross-sectional view of the comer of the frame stretcher of FIG. 2 showing the position of the tapered screw prior to its being rotated into the lower tapered channel formed by the abutting frame members.

Thus, as can be seen in FIG. 3, the frusto-conical portion 44 of screw 42 has yet to penetrate into tapered channel portion 40. Here, disk 26 is fully captured within slots 22 and 24 to provide maximum lateral stability along the combined slot length illustrated by double-ended arrow 64.

Figure 4:
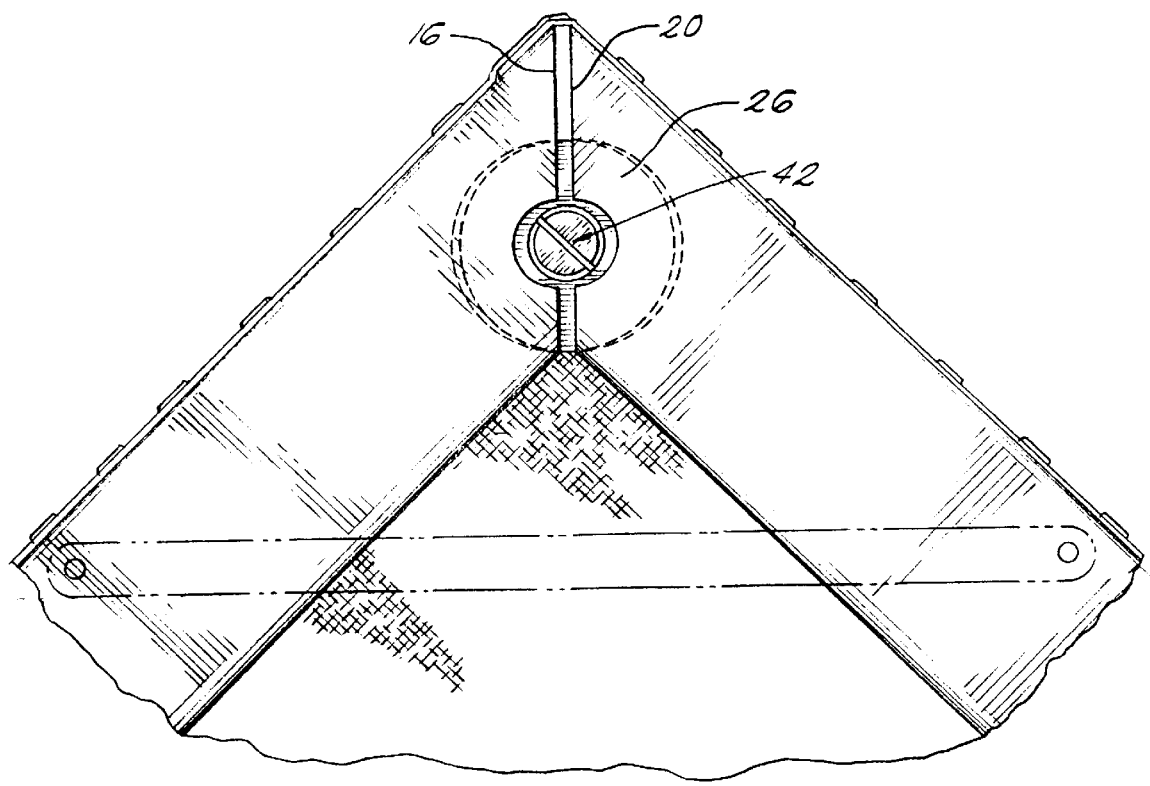
FIG. 4 is a bottom view of the frame stretcher of FIG. 2 illustrating the separation of the abutting frame members with the rotation of the tapered screw into the tapered channel; and, FIG. 5 is a cross-sectional view of the frame stretcher of FIG. 4, illustrating the rotation of the tapered screw into the tapered channel formed by the abutting frame members.
Figure 5:
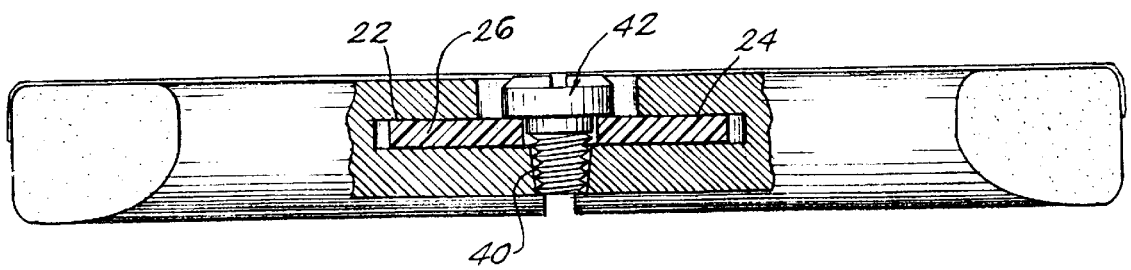

Referring now to FIG. 4, screw 42 has been rotated so as to descend into channel portion 40 as illustrated in FIG. 5, such that ends 16 and 20 are forced apart, with disk 26 providing the sole means of lateral and longitudinal stability for the abutting frame members.

As can be seen from FIG. 5, disk 26 no longer occupies the entire slot length which is the result of slots 22 and 24 being moved apart. However, it is a finding of this invention that a single disk can nonetheless provide the structural rigidity that was originally provided by the double disk structure of U.S. Pat. No. 5,052,462.

While the subject invention has been described in terms of an apertured disk, it will be appreciated that flat inserts of other geometrical configurations will operate satisfactorily.

Having above indicated several embodiments of the Subject Invention, it will occur to those skilled in the art that modifications and alternatives can be practiced within the spirit of the invention. It is accordingly intended to define the scope of the invention only as indicated in the following claims.

What is claimed is:

1. A tensioning picture frame, comprising:

a number of abutting frame members, each having mitered ends, each of said ends having a single insert receiving half slot therein opened at said end, opposed half slots in abutting frame members forming a complete insert receiving slot, each of said ends having an outwardly facing tapered channel having a semicircular cross-section, said channel extending from a top surface of said frame member at the end thereof downward towards the area occupied by said slot opening;

a tapered screw adapted to be rotated into the tapered channel formed by abutting frame members to spread said frame members apart, said screw only engaging said frame at said tapered channel; and, a single apertured flat insert inserted into the slot formed by adjacent frame members such that a mild interference fit exists therebetween, whereby the width of said slot vis a vis the thickness of said insert gives significant dimensional stability to the joint formed between adjacent frame members, whereby the use of a single flat insert prevents warping, twisting or other unwanted frame member misalignments when said screw is rotated into said tapered channel to provide for said tensioning.

2. The tensioning picture frame of claim 1, wherein the thickness of said insert is equal to or greater than the width of said slot.

3. The tensioning picture frame of claim 1, wherein said insert is made of plastic.

4. The tensioning picture frame of claim 3, wherein the surfaces of said insert are self-lubricating.

5. The tensioning picture frame of claim 4, wherein said plastic is Delrin.

6. The tensioning picture frame of claim 4, wherein said plastic is Nylon.

7. The tensioning picture frame of claim 1, wherein said aperture is centrally located.

8. The tensioning picture frame of claim 1, wherein said insert is in the form of a disk.

9. The tensioning picture frame of claim 8, wherein the diameter of said disk is at least two thirds the width of said abutting frame members, whereby said disk offers significant dimensional stability to the joint formed at said abutting frame members.

10. The tensioning picture of claim 1, wherein the completed frame is made up of four abutting frame members.

* * * * *